United States Patent
Rangarajan (10) Patent No.: US 12,548,336 B2
(45) Date of Patent: Feb. 10, 2026

(54) SURVEILLANCE SYSTEM AND METHOD FOR AUTOMATICALLY EXECUTING A SECURITY FUNCTION AND SYSTEM AND METHOD FOR GENERATING A SYNTHETIC TRAINING DATA SET

(71) Applicant: Volkswagen Aktiengesellschaft, Wolfsburg (DE)

(72) Inventor: Pooja Rangarajan, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 339 days.

(21) Appl. No.: 17/840,159

(22) Filed: Jun. 14, 2022

(65) Prior Publication Data

US 2022/0406066 A1 Dec. 22, 2022

(30) Foreign Application Priority Data

Jun. 16, 2021 (EP) .................................. 21179756

(51) Int. Cl.
*G06V 20/52* (2022.01)
*G06V 10/774* (2022.01)
(Continued)

(52) U.S. Cl.
CPC ............ *G06V 20/52* (2022.01); *G06V 10/774* (2022.01); *G06V 20/38* (2022.01); *G08B 21/10* (2013.01)

(58) Field of Classification Search
None
See application file for complete search history.

(56) References Cited

U.S. PATENT DOCUMENTS 10,489,683 B1 11/2019 Koh et al.
10,909,349 B1 2/2021 Tripathi et al.
(Continued)

FOREIGN PATENT DOCUMENTS

CN 112166438 A 2/2021
DE 102008057979 A1 5/2010
(Continued)

OTHER PUBLICATIONS

EP Serial No. 21179756. Search Report (Dec. 8, 2021).
(Continued)

*Primary Examiner* — Gelek W Topgyal
(74) *Attorney, Agent, or Firm* — Peter Zura; LOZA & LOZA, LLP (57) ABSTRACT

Technologies and techniques for automatically executing a security function of a surveillance system with respect to at least one object of interest based on spatially resolved sensor data for environment perception generated by at least one sensor device. Spatially resolved sensor data, is received. A trained machine-learning computer vision model is accessed to determine at least one surveillance parameter. The model includes a set of parameters set to values learned as a result of a training process based on a synthetic training data set, which is generated by rendering at least one model of the at least one object of interest according to at least one render parameter. The generation of the training data set is determined based on at least one environment parameter being characteristic for the environment to be surveilled and/or for the sensor device. The security function is executed depending on the at least one surveillance parameter.

20 Claims, 1 Drawing Sheet

(51) Int. Cl.
*G06V 20/00* (2022.01)
*G08B 21/10* (2006.01)

(56) References Cited

U.S. PATENT DOCUMENTS

| | | | |
|---|---|---|---|
| 12,067,746 B2* | 8/2024 | Taamazyan | G06T 7/75 |
| 2014/0347479 A1* | 11/2014 | Givon | G06V 40/103 |
| | | | 382/116 |
| 2018/0129865 A1 | 5/2018 | Zia et al. | |
| 2018/0129910 A1 | 5/2018 | Zia et al. | |
| 2018/0130229 A1 | 5/2018 | Zia et al. | |
| 2019/0228263 A1* | 7/2019 | Szeto | G02B 27/017 |
| 2019/0251397 A1* | 8/2019 | Tremblay | G06F 18/2148 |
| 2020/0012846 A1 | 1/2020 | Moravec et al. | |
| 2020/0151963 A1 | 5/2020 | Lee et al. | |
| 2020/0167161 A1 | 5/2020 | Planche et al. | |
| 2021/0374393 A1* | 12/2021 | Chandler | G06V 10/764 |
| 2022/0005332 A1* | 1/2022 | Metzler | G06V 20/35 |
| 2022/0174200 A1* | 6/2022 | Xiong | H04N 23/71 |

FOREIGN PATENT DOCUMENTS

| | | | | |
|---|---|---|---|---|
| WO | 2020039121 A1 | 2/2020 | | |
| WO | WO-2020088739 A1 * | 5/2020 | ....... | G08B 13/19613 |

OTHER PUBLICATIONS

Hinterstoisser et al. "An annotation saved is an annotation earned: using fully synthetic training for object detection." 2019 IEEE/CVF International Conference on Computer Vision Workshop (ICCVW) (2019).

EP Serial No. 21179758.4. Article 94(3) Communication (Sep. 27, 2024).

Belov et al. "The use of synthetic data for training the neural network to classify the aircrafts." 2019 Systems of Signals Generating and Processing in the Field of On Board Communications. IEEE Mar. 20, 2019.

* cited by examiner

SURVEILLANCE SYSTEM AND METHOD FOR AUTOMATICALLY EXECUTING A SECURITY FUNCTION AND SYSTEM AND METHOD FOR GENERATING A SYNTHETIC TRAINING DATA SET

RELATED APPLICATIONS

The present application claims priority to European Patent App. EP 21179756.8, to Pooja Rangarajan, titled "Surveillance System And Method For Automatically Executing A Security Function And System And Method For Generating A Synthetic Training Data Set," filed on Jun. 16, 2021, the contents of which is incorporated by reference in its entirety herein.

TECHNICAL FIELD

The present disclosure relates to a surveillance system for surveilling an environment and a method for automatically executing a security function of a surveillance system for surveilling an environment to be surveilled with respect to at least one object of interest, based on spatially resolved sensor data for environment perception generated by at least one sensor device for environment perception of at least a portion of the environment to be surveilled.

The present disclosure also relates to a system and a method for generating a synthetic training data set for training a machine learning computer vision model for surveilling an environment to via at least one user defined object of interest, wherein for the surveillance (e.g., for the surveillance task performed by the machine learning computer vision model), spatially resolved sensor data are processed and evaluated with respect to the at least one object.

BACKGROUND

Security and surveillance is something which is needed in almost all commercial, public or even private properties. Setting up this security and surveillance system is not only time consuming but could also get expensive. There are usually surveillance systems set up which almost always requires the addition of human surveillance. A human typically sits behind the camera and surveys the activities captured by the camera system. Since it is controlled by people, there are possibilities of errors and/or requirements for constant attention by surveillance personnel. This is indicative of security risks and adding more security personnel to avoid events also means additional costs per person for surveillance which gets complex and expensive.

If there are intruders on a property, they are also probably aware of the fact that they are being recorded by camera, but it is mostly too late when these recordings are post analyzed and the intruders have covered their faces. To automate such systems, where you want to set up a surveillance environment and monitor activities if replaced entirely by sensors and robots, i.e. using cameras for surveillance and then using this data and trained neural networks to identify potential threats and do surveillance, requires a lot of data. Hours of real recording of people, vehicles, rooms, environments, etc. are needed which is quite a lot of effort and energy as well.

Video Surveillance as A Service (retrieved from <https://www.vsaas.com/>) is the latest trend in this area where machine learning and AI is helping in surveillance and security. However, most organizations still rely on human security and surveillance. Most of the areas are still control via a control room with personnel sitting behind surveillance areas which receive video streams from the cameras installed on site.

The publicly known solution like VaaS are manual generation of photographs or manual collection of live video streams and time intensive labelling by hand to be used for training of the neural network for part detection or for detection of unusual activity or occurrences. Writing a neural network is also time and effort intensive. Knowledge and experience in computer vision and neural networks is also required to use the data effectively. Manually taking photographs of 500 images or extracting each frame from live stream videos takes over a couple of hours and labelling them manually another days. The training process including creation of a neural network would be another weeks' time of work which is great amount of time and effort required to be spent in the whole process. There are some tools to help the labelling process but this still needs manual work to identify objects in an image which does not decrease the time required by a lot.

On the other hand, manual area security surveillance is also cost and time intensive. It requires security personnel, mostly more than one at the same time to be sitting inside a control room. Also, this includes not being able to monitor single rooms constantly as well. Some people or offices could be afraid of letting a room be monitored or being watch by another human constantly.

The easiest process to avoid costs and manual surveillance would be by training an AI with a lot of data collected and writing a neural network and then passing this labelled data to it. This consumes a lot of time and efforts. Services like VaaS is one of the more modern know solutions to reduce human interaction in security and surveillance. But even for this method, data collection and manual labelling is of course required.

From US 2018/0130229 A1 and US 2018/0129910 A1, a (surveillance) system comprising an image capture device capturing an actual image depicting an object of a target area is known. The surveillance system comprises a processor forming a multi-layer Convolutional Neural Network (CNN) which jointly models multiple intermediate shape concepts based on rendered synthetic images and performing a 3D object parsing on the actual image by applying the CNN to the actual image to generate an image pair including a 2D geometric structure and a 3D geometric structure of the object depicted in the actual image.

From US 2018/0129865 A1, an action recognition system is known which includes an image capture device configured to capture an actual image depicting an object. The system comprises a processor configured to perform an intra-class appearance 3D object parsing on the actual image by applying a CNN thereto to generate an image pair including a 2D and 3D geometric structure of the object. The CNN is formed such as to jointly model multiple intermediate shape concepts based on rendered synthetic images. Furthermore, the processor is configured to control a device to perform a response action in response to an identification of an action performed by the object, wherein the identification of the action is based on the image pair.

SUMMARY

It is therefore aspects of the present disclosure to provide a reliable surveillance system for surveilling an environment to be surveilled and a method for automatically executing a security function of a surveillance system for surveilling an environment to be surveilled with respect to at least one object of interest, which may be designed in a compliant and user-friendly way.

Some aspects of the present disclosure provide a user-friendly system and a method for generating a synthetic training data set for training a machine learning computer vision model for surveilling an environment to be surveilled, which may allow to speed up the process of generating training data and training a machine learning computer vision model for a user even with less expertise or prior knowledge.

At least some of the aforementioned deficiencies of the prior art may be eliminated by the subject-matter according to features recited in the independent claims. Advantageous embodiments and further developments may be found in the subject matter of the dependent claims.

In some examples, a computer-implemented method is disclosed for automatically generating a synthetic training data set for training a machine learning computer vision model for surveilling an environment to be surveilled via at least one sensor device (e.g., a camera) with respect to at least one user defined object of interest, wherein for the surveillance (e.g., for the surveillance task performed by the machine learning computer vision model), spatially resolved sensor data are processed and evaluated with respect to the at least one object (e.g., based on the machine learning computer vision model). At least one two-dimensional (2D) or three-dimensional (3D) model may be received in a processor-based system, configured to generate a synthetic training data set, described in a section below. A user defined object of interest may be configured, based on user input data (e.g., input by at least one user and/or which are received by the system based on user input data input by the at least one user).

In some example, the trained machine learning computer vision model is configured to perform at least one computer vision task (for surveilling the environment to be surveilled) and/or at least one surveillance task. In the at least one user-defined computer vision task (surveillance task) performed by the machine learning computer vision model, spatially resolved sensor data are processed and evaluated with respect to at least one user defined object of interest, under some examples. The spatially resolved sensor data may be provided to be processed and evaluated in the computer vision task (in the surveillance task). The spatially resolved sensor data may be generated by one or more sensor devices, for environment perception such as a camera and/or a series of cameras and/or a plurality of cameras. The spatially resolved sensor data may be derived from a 2D image, which may be captured by a camera. The machine learning computer vision model may include a set of trainable parameters.

In some examples, a computer-implemented method for automatically training a machine learning computer vision model for surveilling an environment with respect to at least one user defined object of interest, wherein, for the surveillance (in particular for the surveillance task performed by the machine learning computer vision model), spatially resolved sensor data generated by at least one sensor device for environment perception of at least a section of the environment to be surveilled are processed and evaluated with respect to the at least one object. The machine learning computer vision model may include a set of trainable parameters.

The trained machine learning computer vision model may be configured to perform a surveillance task and/or a computer vision task. For that, spatially resolved sensor data generated by at least one sensor device for environment perception of at least a section of the environment to be surveilled are processed and evaluated with respect to the at least one object of interest, hereby determining at least one surveillance parameter. The surveillance parameter may be an output of the computer vision task and/or the surveillance task, and, for example, be characteristic for an object of interest which is detected and/or identified and/or a position and/or a size of a detected object of interest.

The present disclosure is also directed to a computer-implemented method for automatically executing a security function of a processor based surveillance system for surveilling an environment with respect to at least one user defined object of interest, based on spatially resolved sensor data for environment perception generated by at least one sensor device for environment perception of at least a section of the environment to be surveilled.

In some examples, spatially resolved sensor data generated by the at least one sensor device is received and processed in the processor based surveillance system.

The present disclosure is also directed to a processor based system for generating a synthetic training data set for training a machine learning computer vision model for surveilling an environment via at least one sensor device with respect to at least one user defined object of interest, wherein for the surveillance (e.g., for the surveillance task performed by the machine learning computer vision model), spatially resolved sensor data are processed and evaluated with respect to the at least one object of interest. The system may include a training data generation unit, which is configured to generate a set of training images by rendering at least one 2D or 3D model of an object of interest based on at least one render parameter and to generate annotation data for the set of training images with respect to the at least one object of interest.

In some examples, the training data generation unit may be configured to receive at least one 2D or 3D model of an object of interest and/or the user defined object of interest based on user input data.

The present disclosure is also directed to using a synthetic training data set generated by the system for generating a synthetic training data set for generating a synthetic training data set for training a trainable machine learning computer vision model for surveilling an environment to be surveilled with respect to the at least one user defined object of interest, wherein for the surveillance (e.g., for the surveillance task performed by the machine learning computer vision model), spatially resolved sensor data generated by at least one sensor device for environment perception of at least a section of the environment to be surveilled are processed and evaluated with respect to the at least one. The machine learning computer vision model includes a set of trainable parameters.

In some examples, training data may be generated using the technologies and techniques disclosed herein, and set according to the synthetic training data set, wherein the machine learning computer vision model is trained based on the training data set.

The present disclosure is also directed to a processor based machine learning unit, in which a machine learning computer vision model is trained based on the training data set generated by set generated by the system for generating a synthetic training data set and/or generated by a synthetic training data set.

Using the synthetic data generator system for security and surveillance is, ensuring added security and more data availability which makes the process easier and faster in terms of data quality with varied light conditions, data itself in the form of CAD models help the neural network to learn the data from multiple angles and positions. This randomization also helps if the parts are placed in a way that was not captured manually by the camera and the video surveillance system. This system and data randomization makes it possible for the network to learn situations and environments which may not have been captured by human observation. This is because, a large amount of training data with the required data annotation can be generated very quickly and used for setting off alarms without human effort needed.

In some examples, a surveillance system is disclosed for surveilling an environment to be surveilled and for automatically executing a security function with respect to at least one user defined object of interest based on spatially resolved sensor data for environment perception, generated by at least one sensor device for environment perception of at least a section of the environment to be surveilled (preferably of the entire environment to be surveilled), wherein the surveillance system is configured to receive spatially resolved sensor data generated by the at least one sensor device.

The surveillance system comprises a processing unit which is configured to process and evaluate the spatially resolved sensor data with respect to the object of interest by means of a trained machine-learning computer vision model for surveilling an environment to be surveilled with respect to the at least one, in particular user defined, object of interest, hereby determining at least one surveillance parameter.

The surveillance system may be configured to execute the security function in dependence on the at least one surveillance parameter.

The present disclosure is further directed to a computer program or computer program product comprising executable program code, which represents or codes at least the method steps of each of the disclosed methods (e.g., computer-implemented method for generating a synthetic training data set; computer-implemented method for training a machine learning computer vision model; model for automatically executing a security function) according to the present disclosure and preferably one of the described preferred embodiments and is designed for execution by a processor device.

The present disclosure is further directed to a data memory on which at least one embodiment of the computer program according to the present disclosure or of one or more embodiments of the computer program is stored.

While the present disclosure is described with respect to a surveillance system and a computer vision model for surveilling an environment to be surveilled with respect to at least one user defined object of interest, one skilled in the art will appreciate that the present disclosure can also be applied to the detection of other environments, as the environments in autonomous driving and the like. Preferably, the security function to be automatically executed corresponds to a vehicle function to be automatically executed (in dependence on the surveillance parameter). A system and a method for automatically executing a vehicle function of a vehicle is also contemplated in the present disclosure.

The vehicle function may be configured as a control function of an at least partially autonomously and preferably (fully) autonomously controlled, vehicle. The vehicle function may be a function being automatically executed as part of a driver assistance system of the vehicle. Here, the sensor device may be a sensor device of the vehicle such as a camera, a radar sensor, a lidar sensor, a thermal sensor, and combinations thereof.

The vehicle function may be a function of a vehicle component of the vehicle. Preferably, the vehicle component may include a system for driving and/or controlling the vehicle, a computer vision system, a navigation system, a warning system, a damping system of the chassis and/or vehicle, a vehicle climate control system, an entertainment system, an infotainment system, an opening system of a vehicle window, a comfort system for increasing the driving comfort of an occupant, a locking system of a vehicle door and/or a vehicle window, a vehicle locking system, a roof removal mechanism, a sunroof mechanism, a vehicle safety system (for example, a brake system), and/or a windshield wiper mechanism, or the like, and combinations thereof.

The present disclosure, including the system and the training data generation unit and/or the machine learning unit and/or the synthetic data generator UI can also be applied to the detection of other environments, as the environments in in any kind of industry like computer vision, automotive, aerospace, transport, production, robotics, medical, electronics, manufacturing, agriculture, communication, education, pharmaceutical, food industry, health care, entertainment, etc.

Further advantages, objectives and features of the present disclosure will be described, by way of example only, in the following description with reference to the appended FIGURE.

BRIEF DESCRIPTION OF THE DRAWINGS

The FIGURE shows:

DETAILED DESCRIPTION

In some examples, user defined computer vision tasks and/or surveillance tasks may include computer vision tasks comprising object detection, object classification, segmentation, detection of a presence of an object or a person (where not expected in dependence of the timing of day, for example during night and day), anomaly detection, tasks in (intelligent) robotics, pose estimation, target perception task, detecting and/or tracking gestures or the like and combinations thereof.

As disclosed herein, at least one render parameter may be determined by the processor-based based on user input data (being input by the user).

In some examples a set of training images may be automatically rendered in a processor-based system by utilizing at least one model of the object of interest, based on the at least one or more render parameters. Preferably, the at least one model of the object of interest is rendered to produce a rendered image of the object of interest. The training image may include the rendered image and a (rendered) background image.

In some examples, annotation data may be automatically generated by a processor-based system for the set of training images with respect to the at least one object of interest. In particular, annotation data is generated for each training image (with respect to each object of interest present in the scene). In particular, for each object of interest present in a scene and/or in the (training image) annotation data is generated (and is provided). Thus, in particular annotation data may be included for each object of interest present in the scene.

In some examples, a training data set may be automatically provided by the processor-based system, wherein the training data set may include the set of training images and the annotation data for being output to the user and/or for training the machine learning computer vision model. Preferably, the training data set serves as input as training data set for the training process of the computer vision model.

Preferably, the generated training data set is transmitted by the processor-based system to a user interface to be output to the user and/or to a processor-based machine learning unit for training the machine learning computer vision model for performing, e.g., the at least one user defined computer vision task. Preferably, the user and/or a machine learning unit gets and/or receives training images and/or annotation data files including labels, bounding boxes and/or camera parameters.

In particular, the present disclosure relates to the generation of photorealistic synthetic data for training a machine learning computer vision model, in particular for training an artificial neural network and the like.

Data generation process is usually time and effort intensive, where enormous amounts of time is spent in collecting data manually by taking photographs and collecting hours of video capture streams of area surveillance of the objects from various angles and labelling them manually. Sometimes, it is also challenging to get so much data to cover different kinds of areas as required for using an artificial intelligence for an area security and surveillance which has been trained on synthetic data. Data often has to be recorded for each specific area. This process usually takes weeks to be completed successfully and then a few days to test the data for training the network for the process of detection of the object. After this, the model has still to be tested to check if the data is sufficient to be used for detection especially where there can be no errors like in the area or security and surveillance. If not, data needs to be collected again and, this process needs to be optimized to the maximum extent. This saves more than 90 percent time in the process of data generation, training and testing.

Preferably, the user defined object of interest is defined and/or determined by the at least one user using a 2D or 3D model of the object of interest being input and/or being preset by the at least one user.

As used herein, receiving at least one 2D or 3D, model of a user-defined object of interest, based on user input data, is to be understood as receiving the model via a wired and/or wireless communication connection or network. The receiving event may be locally distanced from the place where the user input data are imported and/or generated and/or input (by the user).

Preferably, the user input data are characteristic for the at least one model of the object of interest. In particular the model, and in particular a three dimensional structure and/or shape of the object of interest, may be derived from the user input data without further stored data and/or information with respect to the model. The model may be input by the user and/or transmitted to the system, for instance in a CAD (Computer Aided Design) format or the like as data files of type .glb, .gltf, .obj, .stp, .fbx and/or other data format of other applications for virtual product development. Preferably, the input format for the model is flexible. Using models as CAD models for training, in particular for generating training datasets, also helps in achieving a dataset for the neural network or for the machine learning computer vision model which sometimes is difficult to obtain with manual photography.

It is, however, conceivable that at least one 2D and/or 3D model is provided, for example, by accessing a memory device (which preferably is part of the system) on which the at least one model is stored. In this case the user may be able to select at least one model provided by the system from the plurality of models provided (for instance at least three, preferably at least four, preferably at least five, preferably at least ten, preferably at least 20 models provided and/or stored on a storage device which may be assessed by the system). In this case, receiving at least one model of a user defined object of interest based on user input data is initiated by the user selecting at least one of the models provided.

Providing models which are selectable by the user offers the advantage, that generic objects of interest which are frequently requested by users for instance humans and/or buildings and/or hands (e.g., for detecting gestures) or the like do not have to be constructed by the user but may be selected resulting in a very time efficient way for the user to create user defined training data sets.

Some of the solutions for synthetic data generators available online are quite generic, like providing standard common environments like roads or airports for the detection of cars or other vehicles.

Accordingly, a plurality of 2D or 3D pairwise models of different user defined objects of interest may be determined based on user input data, and/or received by the system. This offers the advantage that the machine learning computer vision model may be trained with respect to more than one object of interest and thus advantageously a more complex environment with more object of interests may be simulated. The at least one object of interest may be a physical object, which in particular is movable with respect to the environment to be surveilled.

In some examples, the generation of the training data set may be configured using at least one user defined model of the object of interest and/or the at least one user defined render parameter and/or at least parts of a rendered training image, based on at least one environment parameter being characteristic for the environment to be surveilled and/or for the sensor device.

In other words, the generation of the training data set may be determined based on the at least one environment parameter. Additionally and/or alternatively, the at least one model of the object of interest and/or the at least one render parameter and/or at least parts of the rendered training image (for example at least one part of the background) may be determined based on the at least one environment parameter. For example, the environment parameter can be characteristic for a geometric structure of the environment to be surveilled and/or a (predetermined and/or preset and/or user defined and/or average) lighting condition of a time period in which the environment to be surveilled shall be surveilled and/or a (predetermined and/or preset and/or user defined and/or average) number of objects of interest (in particular in dependence of a position with respect to the environment to be surveilled) which are present in the environment to be surveilled.

Furthermore, the environment parameter being characteristic for the sensor device may, for example, be a parameter being characteristic for a surveillance position and/or orientation and/or recording direction of the at least one sensor device. Moreover, the environment parameter being characteristic for the sensor device may be, for example, a recording parameter being characteristic for the type of sensor data generation (for example, a color sensitive data generation and/or a wavelength range of the radiation and/or a radiation type which is to be captured by the sensor device and/or the type of sensor data generated by the sensor device).

This offers the advantage that the computer vision model and or its training may be adapted to the environment to be surveilled as to the type of object of interest (e.g., vehicle, car, human, signs, and the like) and/or number and/or spatial and/or temporal distribution of objects of interests which are in a normal state of the environment to be surveilled, or may be present in the environment to be surveilled and/or to fixed structures (e.g., buildings, walls of a room and the like), lighting conditions (e.g., indoor, outdoor) which are present in the environment to be surveilled.

In the case of outdoor, surveillance, a plurality of pairwise different photorealistic background images and/or 3D environment data may be taken into account for the generation of training images, which may differ in the timing of the day and/or the lighting condition.

In some examples, at least one render parameter may be determined based on a field of view of at least one sensor device and/or a position of at least one sensor device and/or an orientation of at least one sensor device and/or a capturing direction of at least one sensor device and/or a sensor data generation parameter (for example, focal length with which images are captured) of the at least one sensor device. This allows to model and/or simulate the environment to be surveilled in a very close manner. This enables a user to obtain training images and/or a training data set which may be very close to the real environment to be surveilled.

In some examples, the set of training images may be generated based on photorealistic, background images and/or 3D environment data of at least a part of the environment to be surveilled. Preferably, the set of training images comprises training images, and the generation of the training images may be based on background images and/or 3D environment data, which depict at least a part of the environment to be surveilled from a (potential) perspective of the at least one sensor device or of at least one of the plurality sensor devices in a state in which the sensor device(s) are installed for surveilling the environment to be surveilled.

In some examples, at least some of the background images cover an identical part of the environment to be surveilled, compared to at least one sensor device and in a state in which the sensor device(s) is/are installed for surveilling the environment.

In some examples, separate training data set may be generated for each sensor device of the surveillance system. Preferably, for the generation of the training images and/or the training data set, the render parameters and/or models of the object of interest are determined with respect to the specific sensor device of the surveillance system.

In some examples, the set of training images may be generated based on a random variation of a lighting condition and/or a weather condition and/or a timing of the day. This advantageously allows to obtain training images which get as close as possible to the real world environment to be surveilled.

In some examples, a user interface is provided wherein the user interface may be configured as user input device for user input data being input by the user with respect to the at least one model, the at least one render parameter and preferably a plurality of render parameters, the training images to be generated, the number of generated training images and/or training images to be output, and/or the annotation data to be generated (e.g., which label name is used with respect to a given object of interest to label the training images). Preferably, the user interface is a graphical interface. The user input data being input by the user via the user input device may be stored in a memory device of the system or which may be accessed by the system. Thus, the label name and/or an image count and the like may be set by the user and/or based on user input data via the interface.

Providing an easy to use user interface (UI) to automate the process of data collection, generation and training may advantageously simplify the interface process. With a UI being easy to use, it is very easy for everyone to work with artificial intelligence and/or machine learning computer vison models with no special knowledge or set up required. Using this UI, the user can use advanced functionalities of data generation, labelling and neural network training without bothering about what is going on at the backend.

In some examples, the user interface may be configured as an output device for outputting and displaying information and/or the generated training data set to the user. Preferably, the user interface is configured to optionally preview the training images (preferably in real time), to preview the training images that would be rendered in real time according to the at least one render parameter, and to the plurality of set and/or user defined render parameters such as lighting, rotation, etc., for the plurality of render parameters that the user is currently setting on the user interface.

In some examples, the method and/or the system may be implemented in a distributed computing system that includes a back-end component and/or a front-end component. The back-end component can, for example, be a server, such as an external server, on which computer-implemented method may be carried out. The external server may be configured as a backend of a (for example vehicle) manufacturer or a service provider. The functions of the backend or the external server may be performed on external server farms. The external server may be a distributed system. The external server and/or the backend may be cloud-based.

The front-end component can, for example, be a client computer and/or a user terminal, like a tablet or a smartphone, having an in particular graphical user interface, a web browser through which the user can interact with the back-end component, and/or other graphical user interfaces for a transmitting device. Preferably, the back-end component and/or the external server can be securely hosted in a specific, optionally user defined, region as for instance in the European Union.

Advantageously, the user can generate complex datasets and train different kind of objects without having to worry about how it is working in the backend with the UI.

Preferably, the method allows an end to end training data generation.

In some examples, at least one render parameter and preferably a plurality of render parameters may be determined based on user input data, wherein the at least one render parameter and preferably the plurality of render parameters are determined randomly taking into account the user input data.

Using the synthetic data generation and training User Interface, the process is made easier and faster, providing high amount of randomness and variety in the training data with limited physical and mental effort. This randomization also helps if the parts are placed in a way that was not captured manually by the camera. When using synthetic data using to train a network, randomization makes it possible for the network to learn situations and environments which may not have been captured by human observation. This is because, a large amount of training data with the required data annotation can be generated very quickly in the application and trained. With the suggested solution and an automated pipeline (or system) to train the network (or the machine learning computer vision model), the goal to achieve the process of data rendering and training in one click is realized and thus anyone is enabled to work and use artificial intelligence for varied applications.

The combination of adjusting render parameters to user specific settings while being determined in a random way, advantageously results in a relatively fast and highly randomized generation of training data which is adjusted to the intended use of the user of the training data and/or the computer vision task that shall be performed.

In some examples, user input data may be received, along with at least one and preferably at least two boundary values for each of one or more render parameters. A random value may be determined for the at least one parameter taking into account the at least one (user set) boundary value, respectively. A random value may be determined within a range defined by at least one boundary value set and/or determined by the user and/or at least two boundary values set and/or determined by the user.

In some examples, at least one render parameter may be varied with respect to a rotation of an object of interest and/or a position of an object of interest and/or a background and/or a lighting for generating the training images and/or annotation data. The at least one render parameter and preferably the plurality of render parameters are varied based on the user input data and based on the boundary value(s) which in particular is or are set by the user. This advantageously offers the advantage that rotations, positions, backgrounds, lighting are varied and in dependence of set render parameters. Preferably, multiple render parameters are variated.

The user interface may be configured to indicate and/or output and/or display and/or visualize pre-set (boundary) values for at least one render parameter and preferably for all render parameters that may be determined by user input data.

The communication may include communicating (receiving/transmitting) data via a wired and/or wireless connection that may be encrypted, under some examples.

The user interface and/or the communications may be configured exchange data between the user interface and/or the user and the system and/or the training data generation unit for a secured import and/or upload of 2D/3D models of the at least one object of interest or CAD data.

The user interface and/or the communications may be configured for a secured output of the generated training data set for neural networks.

Accordingly, a user has the ability to upload their own background images as well for certain environments like factories or roads within the environment to be surveilled. These environments can be 2D and/or 3D data.

The user interface may include an interaction element that enables a user to import and/or to add at least one background image and/or 3D environment data and preferably a plurality of background images. The background images imported and/or added by the user may be stored in a memory device and/or a backend-server. Preferably, the training image may be generated based on the background image and/or based on rendering the 3D environment data (e.g., to produce a background part of the training image).

In some examples, generating the set of training images may include selecting a set of background images is (in particular randomly) from a plurality of background images. Preferably, the set of background images is a set of, user defined, (custom) background images based on user input data and/or a set of background images added and/or imported by the user.

A plurality of user-independent, (default) background images may also be provided, which are stored on a memory device (of the system and/or which may be accessed by the system). This offers the advantage that the user can initiate (e.g., automatically) generating a training data set without actively providing and/or uploading images. Preferably, the set of training images which is randomly selected is selected based on the plurality of (default) background images.

Preferably, the user may select (via the user interface) whether the set of (randomly) selected background images are selected from the set of, user defined, (custom) background images which may be uploaded and/or imported by the user and/or the set of, user-independent, (default) background images (which are provided by the system).

Preferably, the training images are generated using a set of more than 5, preferably more than 10, preferably more than 100, preferably more than 500, preferably more than 800, preferably more than 1000 and particularly preferred more than 2000 background images. Preferably, a random set of over 2000, in particular user-independent, (custom) background images are provided.

At least one (custom and/or default) background image may be used to generate more than one, preferably more than two, preferably more than 5, preferably more than 20, preferably more than 100 training images. For instance, if more training images are rendered than background images are provided, a given background image can be repeatedly used.

User defined (custom) background images and user-independent (default) background images may be used in the rendered (training) images. This variation makes the training dataset more diverse and thus the trained machine learning computer vision model is more robust with respect to different backgrounds.

It is also conceivable, however, to use only one background image to generate all training images based on this background image. For instance, if the (intended) use takes place in an environment in which the background is always black than only one (black) background image is needed.

Preferably, the user may indicate and/or set the number of (different) background images which are used to generate the training images. This allows to adapt the training data set to the user specific application.

Each training image may be generated based on a photorealistic background image. Preferably, only photorealistic background images are used. This offers the advantage that the generated training images are closer to reality. This should help with the domain adaption of the mode (from virtual to reality).

The at least one render parameter may include a group of render parameters being characteristic for a view of the object of interest, for a field of view in particular of a camera for the rendering process, for a size and/or a zoom range of the object of interest, for an orientation and/or a position of the at least one rendered object of interest within the training image, for a view angel, for a roll of the rendered model and/or for a rotation and/or a translation of the at least one object of interest, for a cropping of the at least one object of interest, for an occlusion of the object of interest, and/or for a number of model instances, and/or the like and/or combinations thereof.

This offers the advantage, that the model, as well as the view, may be adapted very close to the intended user specific training task, and its environment that is captured by a sensor device to produce the locally resolved training images. For instance, by means of setting the number of model instances rendered in the image, the environment may be modelled in a very precise way. For instance, if an environment of a crowded market place is of interest with respect to the (user intended) computer vison task to be performed by the trained machine learning computer vision model the training result might be closer to reality if more than one model of a human is rendered in the image.

Preferably, more than one, preferably more than two, preferably more than 5, preferably more than 10, and particularly preferred all of the above-mentioned render parameters may be set and/or amended by the user (to generate the training images).

The field of view may set the field of view of a camera for the rendered images (e.g., in degrees). A zoom parameter may be provided to adjust how close to the camera is to the object rendered. A zoom range slider may be displayed by the user interface in order to visualize the presently set zoom range.

A view angle may be controlled by the user (e.g., between 0-360°). A view angle of zero would mean in one example that the view angle of the rendered image is always fixed to the side facing the camera versus a view angle of 360° in particular means that the images are rendered from all around the object. This advantageously offers the possibility to adapt the orientation of the at least three dimensional model defined by the user of the object of interest with respect to the camera, based on which the image is rendered, to the orientation of the object of interest occurring in reality, with respect to the sensor device capturing the locally resolved sensor data. Thus, the user specific application of the computer vision task may be modelled in a more precise way.

Preferably, a roll and/or a roll angle of the rendered model may be controlled by the user via the user interface.

A cropping parameter may be characteristic for a percentage of the model rendered in the images and may be controlled by the user via the user interface. A cropping percentage (for rendering the model) may be randomly chosen within 0 and the set cropping value, under some examples.

An occlusion parameter which is characteristic for introducing an occlusion effect in the rendered image may be determined by the user via the UI.

Accordingly, setting up the render environment with lighting and other environmental conditions for indoor and outdoor environments among many other parameters, would not be affected by weather conditions.

In some examples, the at least one render parameter may include a parameter characteristic for a maximum number of distraction objects, a lighting condition of the training image, an illumination of the objects and/or the background in the training image, a number of light sources, a variation of light intensity, a variation of color variation, for the inclusion of shadows, a blur and/or a noise, in particular for a noise intensity (and/or a noise intensity variation) and/or a noise size (and/or a noise size variation), in the rendered image and/or the training image, and the like and/or combinations thereof.

At least one distraction object, which may be randomly selected from a plurality of distraction objects, may be included in at least one training image in some examples. Preferably, for each generation of training image, a random number of distraction objects (between 0 and a maximum value which may be set by the user) is determined and the determined random number of distraction objects is rendered in the training image. The annotation data are not generated with respect to any of these distraction objects in some examples. This offers the advantage that, during the training procedure of the machine learning computer vision model, this model learns to focus on specifics of the at least one object of interest, instead of the randomly occurring distraction objects.

The user interface may contain more than one option for randomizing the render parameters such as handling occlusion parameter, addition of distraction objects, custom backgrounds, and so forth.

A random number of light sources (e.g., between 1 and a maximum value in particular adjustable and/or set by the user) may be rendered.

The lighting condition of at least one object of interest and/or of the background image and/or background scene for illumination of the at least one object of interest and/or the background of the training image may be varied and/or adjusted and/or controlled by the user.

A random variation of light intensity, which may be controlled by the user via setting a maximum percentage, may be introduced in the training image.

A random variation of noise between 0 and a percentage (set by the user) in the rendered images may be introduced.

At least one texture parameter being characteristic for the texture of the user defined object of interest may be determined and the texture of at least one distraction object to be included in at least one training image may be adjusted, based on the at least one determined texture parameter. The visual appearance of at least one distraction object may be adjusted to the visual appearance of at least one object of interest and/or (rendered) model of object of interest.

This offers the advantage, that during the training procedure of the machine learning computer vision model, the computer vision model focuses more on the form and/or the shape and/or the size of the object of interest. This advantageously makes the result of the computer vision task more accurate.

The generated (training) images may include the rendered image and/or a segmentation map(s), and/or UVW maps.

The annotation data (e.g., which may be annotation XML files for every (training) image) may include at least one parameter including bounding boxes, camera parameters, field of view (FOV), 6DOF values (6 degrees of freedom values), image label and the like, as well as combinations thereof.

In some examples, the user can import one or more 3D models via the user interface, and control each model individually, if required and/or wished by the user.

The annotation data may be generated based on the user input data. For example, the user may determine via input user data whether a segmentation shall be performed by the system and/or whether a segmentation map shall be output to the user via the user interface.

According to the present disclosure, a training data set may be generated using synthetic training data sets for training a machine learning computer vision model for surveilling an environment for performing at least one user defined computer vision task, and/or receiving a training data set generated by a synthetic training data set for training a machine learning computer vision model for performing at least one user defined computer vision task described herein. The machine learning computer vision model may be trained, based on the training data set.

The training may include receiving training images and/or training data files that may include labels and/or bounding boxes and/or camera parameters which may have been used for automatically rendering the images.

The training of the machine-learning computer vision model may include determining a value for each of the trainable parameters of the set of trainable parameters in each of the subsequent training steps, wherein these values (e.g., the values of all trainable parameters) are determined based on the set training data generated by the training data generation unit.

In some example, the type of the machine-learning computer vision model may be selected based on user input data with respect to the computer vision task to be performed by the machine learning computer vison model. Preferably, at least one (pre-written) use case specific machine learning computer vision model, in particular neural network, may be provided to choose from, in particular with one click, on the UI.

The solution proposed herein is estimated to take 90% less time and effort as compared to a manual collection of live video streams and photographs. Also 3D models of humans suppress the risks of using live streams on actual humans and people because of security reasons. It is not very efficient to use actual people for training your models and neural networks. Using models (e.g., CAD) for training also helps in achieving a dataset for the neural network which sometimes is difficult to obtain with manual photo and videography. Similar advantages may be found for uses with other objects like cars, building, numbers, which are easy to get and use in synthetic data format.

This makes the whole process of building the surveillance system faster and also automated.

In some examples, at least one user specific use parameter is determined, based on user input data, with the at least one use parameter being characteristic for the user defined computer vision task, wherein the machine learning computer vision model is determined based on the user specific use parameter.

In some examples, the machine learning computer vision model may be configured as a artificial neural network. Preferably, the artificial neural network is configured as a deep artificial neural network, in particular in which the parameterizable processing chain has a plurality of processing layers.

The artificial neural network may be configured as a convolutional neural network (CNN) and/or a recurrent neural network (RNN) and/or a (fast) R-CNN (recurrent convolutional network).

Preferably, more than 1000, preferably more than 1400, preferably at least 1500, and particularly preferred more than 2000 training images and annotation data are generated and in particular used for training the machine learning computer vision model.

Preferably, a mix of real images (captured by a camera) and synthetic generated training images are used for training the machine learning computer vision model. Preferably, at least 800 images (comprising a mix of real images and synthetic training images) are used for training the machine learning computer vision model.

Preferably, the processing provides an automated result evaluation.

In some examples, the training of a machine learning computer vision model for performing at least one user defined, computer vision task includes evaluating the computer-implemented vision model, trained with the provided training data set, and determining an evaluation parameter being characteristic for the accuracy of the computer-implemented vision model.

The determination of the evaluation parameter may be based on a deviation of the output (for a given parameterization) of the machine learning computer vision model, such as a deviation (loss) of the neural network from measured ground truth based on the generated annotation data. The loss function used preferably is selected in such a way that the parameters depend on it in a differentiable manner. As part of the optimization process, the parameters of the neural network may be adapted in each training step depending on the derivative of the loss (determined on several examples) such that the loss is minimized. These training steps are repeated often until the loss no longer decreases.

The training of a machine learning computer vision model for performing at least one user-defined, computer vision task may include generating and providing a further set of training data in dependence of the evaluation parameter. In particular, training data may be re-generated in dependence of the evaluation parameter. Preferably, the evaluation parameter is compared to a pre-set precision value and/or a precision value which may be set by the user.

In some examples, the training of the machine learning computer vision model may be performed in a closed loop, until the precision of the machine learning computer vision model is utilized as the evaluation parameter.

In some examples, a trained machine-learning computer vision model for surveilling an environment with respect to the at least one user defined object of interest may be accessed, wherein for the surveillance (e.g., for the surveillance task performed by the machine learning computer vision model), the spatially resolved sensor data are processed and evaluated using the trained machine learning computer vision model with respect to the at least one object of interest, hereby determining at least one surveillance parameter. In particular, the machine learning computer vision model performs at least one computer vision task.

The surveillance parameter may be an output of the computer vision task and/or the surveillance task, and, for example, be characteristic for an object of interest which is detected and/or identified and/or a position and/or a size of a detected object of interest.

The machine learning computer vision model may include a set of parameters set to values learned as a result of a training process based on a synthetic training data set, which is, in particular automatically, generated by rendering at least one, in particular 2D or 3D, model of the at least one object of interest according to at least one render parameter.

The generation of the synthetic training data set, preferably at least one model of the object of interest and/or the at least one render parameter and/or at least parts of a rendered training image, may be determined based on at least one environment parameter being characteristic for the environment to be surveilled and/or for the sensor device.

In other words, the step of how to generate the training data set (e.g., the generation of the training data set) may be determined based on the at least one environment parameter. Additionally and/or alternatively, the at least one model of the object of interest and/or the at least one render parameter and/or at least parts of the rendered training image (e.g., at least one part of the background) may be determined based on the at least one environment parameter. For example, the environment parameter can be characteristic for a geometric structure of the environment to be surveilled and/or a (predetermined and/or preset and/or user defined and/or average) lighting condition of a time period in which the environment to be surveilled shall be surveilled and/or a (predetermined and/or preset and/or user defined and/or average) number of objects of interest (in dependence of a position with respect to the environment to be surveilled) which are present in the environment to be surveilled.

Furthermore, the environment parameter being characteristic for the sensor device may, for example, be a parameter being characteristic for a surveillance position and/or orientation and/or recording direction of the at least one sensor device. Moreover, the environment parameter being characteristic for the sensor device may be, for example, a recording parameter being characteristic for the type of sensor data generation (for example, a color sensitive data generation and/or a wavelength range of the radiation and/or a radiation type which is to be captured by the sensor device and/or the type of sensor data generated by the sensor device).

In some examples, the surveillance may include executing a security function in dependence on the at least one surveillance parameter of the processor based surveillance system.

The security function may include a warning and/or a feedback function for a user and/or (at least parts) of the environment to be surveilled and/or a locking function (of parts and/or buildings and/or doors and/or gates) of the environment to be surveilled. For instance, the security function may serve to report if any suspicious activity or threat is detected.

The suggested solution using machine learning models, and preferably, artificial intelligence, for area security and surveillance which has been trained on synthetic data save a significant amount of time, effort and costs in collecting, preparing and labelling real data and streams on video. Real life video streams if used for training, need to be cut down into single frames and then processed and fed for training algorithms which is even more time and energy intensive to label every single frame separately.

On the other hand, when manual surveillance is used, human errors can occur and miss occurrences sitting in the control room. By the time a human detects that an usual activity has occurred, alerts colleagues and then takes an action, it is sometimes too late. That is why our solution proposes an all-round camera surveillance with sensors for detection of movement at unusual times, synthetic data training, and feedback signaling system to alert and automatically control entry and exists based on the user preference.

The at least one sensor device used for surveilling the environment to may be communicatively connected to the surveillance system. It is conceivable, that the surveillance system comprises the at least one sensor device and in particular the plurality of sensor devices used for surveilling the environment.

The model of the object of interest may be received based on user input data. Preferably, the at least one render parameter may be determined based on user input data (e.g., input via a user interface by a user for training the machine learning computer vision model).

The surveillance system may be configured to process and evaluate real-time spatially resolved sensor data. The at least one sensor device may be configured to capture spatially resolved sensor data and immediately transmitted to the surveillance system for processing and evaluating the sensor data in real time. This allows, advantageously, to pass a live video stream captured by the cameras installed on the site in the surveillance areas and/or the environment to be surveilled to the surveillance system and in particular to detect any threats or unusual activities without or with minimal human intervention.

In some examples, an object of interest detected by means of the machine-learning computer vision model is evaluated with respect to a threat to the environment to be surveilled and/or with respect to its authorization, in dependence on the location of detection and/or time of detection and/or its identification. In particular the surveillance task performed by the machine learning computer vision model includes determining whether the result of the computer vision task performed by the machine learning computer vision model (for instance detection of an object of interest and/or the presence of an object or a person), is to be categorized as a (in particular potential) threat. This may include determining whether the detected object of interest and/or person is authorized to be at the detected place. For that, an identification and/or authorization of the detected object of interest and/or the person may be determined (for instance via number plates and/or identification card of the person).

In some examples, a warning signal may be determined in dependence on the surveillance parameter, and the warning signal may be outputted to a predetermined contact person, by an output device. Preferably the system comprises the output device. The output device may be an optical and/or acoustic output device. This advantageously allows to report and/or to give feedback if any suspicious activity is detected.

In some examples, a memory device is provided, on which contact data being characteristic for a contact person, to whom the warning signal is to be output, can be stored and from which the contact data for the contact person, to whom the warning signal is to be output, can be retrieved by the surveillance system.

A contact person may be determined, to whom the warning signal is to be output, based on retrieving a storage device by the surveillance system. Preferably, the contact data for the contact person may be preset and/or set by a user of the surveillance system.

In some examples, the security function may include activating a security state of the environment to be surveilled, in which in particular entrances and exits to and from at least parts of the environment to be surveilled are locked. Preferably, the security state is maintained until it is unlocked by the user. This again increases the safety of the environment to be surveilled.

The training data generation unit may be configured to use the model of the object of interest received based on user input data for rendering the at least one 2D or 3D model of the object of interest (to generate the set of training images) and/or to generate the annotation data for the set of training images. Preferably, the training data generation unit is configured to use the model of the object of interest received based on user input data to generate the synthetic training data set. In particular, the object of interest with respect to which the machine-learning computer vision model processes and evaluates the spatially resolved sensor data, corresponds to and/or is the object for which the training data generation unit received the model of the object of interest based on user input data.

The system for generating a synthetic training data set and/or the training data generation unit may be configured to generate a synthetic training data set (in particular the set of training images and/or annotation data) with respect to the (model of the object of interest) received (by the training data generation unit). The user defined computer vision task may be user defined in the sense that the machine-learning computer vision model is trained with the synthetic training data set which is generated by the training data generation unit based on the model of the object of interest received by the training data generation unit.

Furthermore, the training data generation unit may be configured to determine the at least one render parameter based on user input data, and wherein the training data generation unit is configured to provide a training data set comprising the set of training images and the annotation data for being output to the user and/or for training the computer vision model.

The disclosed system offers the advantage that it provides an easy to use interface and synthetic training data generation system for a surveillance system which is adaptable to the environment to be surveilled. The system enables import of one of more 2D or 3D data that can be used to render images in a very short period of time, with minimal effort, and further also train this data in a way that is adapted to the given use case and is highly adaptable to the environment to be surveilled making use of computer vision tasks in the fields of object classification, detection, segmentation or pose estimation. The system's straightforward and easy to use intuitive UI enables the user to generate and train data without having prior knowledge of data generation. This data is further passed on to the computer vision platform where the user can proceed with training the neural networks within just one click. This whole process of data generation and training can be triggered by the user using the user interface.

The system may be configured to carry out any of the processes/methods disclosed herein for generating a synthetic training data set for training a machine learning computer vision model individually or in combination with each other and/or for training a machine learning computer vision model, individually or in combination with each other. The processes/methods may be provided with all features described in the context of the system, individually or in combination with each other. Furthermore, the disclosed system may be provided with all features described in the context of the system, individually or in combination with each other.

In some examples, the training data generation unit may be configured to carry any of the processes/methods for generating a synthetic training data set for training a machine learning computer vision model individually or in combination with each other. The processes/methods relating to the training data generation unit may be provided with all features described in the context of the training data generation unit, individually or in combination with each other.

In some examples, the system may be configured to provide user interaction and/or a device for providing a user interaction. For instance, the system may include a device for providing a user interface (e.g. enabling the communication with a user interface which may be part of the system or which may be provided by a user terminal).

The user interface may include an interaction element that is operable by the user. Preferably, by operating the interaction element and/or by inputting data via the user interface, the user may initiate and/or trigger an automatic generation of a (synthetic) training data set and/or an automatic training of a machine learning computer vision model (e.g., via a click and/or at least one click and/or one click).

The system may include a memory device to store the at least one model of the object of interest and preferably the plurality of models of objects of interest and/or (default and/or custom) background images to generate and/or produce the training images. Preferably, the system comprises a memory device to store the generated training images and/or annotation data.

According to the present disclosure, the machine learning computer vision model may include a set of parameters set to values learned as a result of a training process based on a (synthetic) training data set, which is, in particular automatically, generated by rendering at least one, in particular 2D or 3D, model of the at least one object of interest according to at least one render parameter (and preferably by rendering a plurality of, in particular 2D or 3D, models of the at least one object of interest and in particular of a plurality of objects of interests). Preferably, the model of the at least one object of interest and in particular the models of the plurality of objects of interest are determined and/or received based on user input data.

Preferably, the generation of a synthetic training data set, using at least one model of the object of interest and/or the at least one render parameter and/or at least parts of a rendered training image, is determined based on at least one environment parameter being characteristic for the environment to be surveilled and/or for the sensor device.

In other words, the training data set and the generation thereof may be determined based on the at least one environment parameter. Additionally and/or alternatively, the at least one model of the object of interest and/or the at least one render parameter and/or at least parts of the rendered training image (for example at least one part of the background) is determined based on the at least one environment parameter. For example, the environment parameter can be characteristic for a geometric structure of the environment to be surveilled and/or a predetermined and/or preset and/or user defined and/or average lighting condition of a time period in which the environment to be surveilled shall be surveilled and/or a predetermined and/or preset and/or user defined and/or average number of objects of interest (e.g., in dependence of a position with respect to the environment to be surveilled) that are present in the environment to be surveilled.

Furthermore, the environment parameter being characteristic for the sensor device may, for example, be a parameter being characteristic for a surveillance position and/or orientation and/or recording direction of the at least one sensor device. Moreover, the environment parameter being characteristic for the sensor device may be, for example, a recording parameter being characteristic for the type of sensor data generation (such as a color sensitive data generation and/or a wavelength range of the radiation and/or a radiation type which is to be captured by the sensor device and/or the type of sensor data generated by the sensor device).

In some examples, the surveillance system may be configured to carry out the processes/methods disclosed herein, in the context of automatically executing a security function of a surveillance system individually or in combination with each other and/or to carry out processes/methods in the context of the method for training a machine learning computer vision model, individually or in combination with each other. The processes/methods may be provided with all features described in the context of the system, individually or in combination with each other. Furthermore, the may be configured with all features described in the context of the surveillance system, individually or in combination with each other.

The security and surveillance system built on synthetic data is advantageously configured for relatively fast and varied generation of training data to be used for area security and surveillance monitoring in private and commercial spaces. It also eliminates the need for human intervention and watching the area constantly. This makes it much easier also to achieve indoor surveillance because people will not be very comfortable with themselves being recorded constantly and used for surveillance and security. Using synthetic data for training, e.g., via a Fast R-CNN network, provides a good level of security without the need of recording hours of data or sitting behind control rooms to alert people if something goes wrong.

The configurations disclosed herein advantageously reduce the delay in taking action once a suspicious activity has been detected since the user has the possibility to set off an alarm signal when something unusual is detected in the area under surveillance and also the option of automatically locking the entry and exists to the property. This ensures and helps in the escape of the intruder till the area, room or property has been checked.

Such configurations have the ability to set up the render environment with lighting and other environmental conditions for indoor and outdoor environments.

The availability of a variety of environments (to be surveilled) like airports, parking lots, offices and rooms makes it possible to generate images that are quite realistic and work well when trained with R-CNN network for area surveillance. Thus, some of the advantages include time saving, easy data collection, possibility to use a wide variety of realistic synthetic data, reduced or no requirement of control rooms or human surveillance, data security of people since you do not use real video and images or real people, lot of different parameters for training like different environments, lightings, weather for outdoor and indoor surveillance among other advantages.

Figure 1:
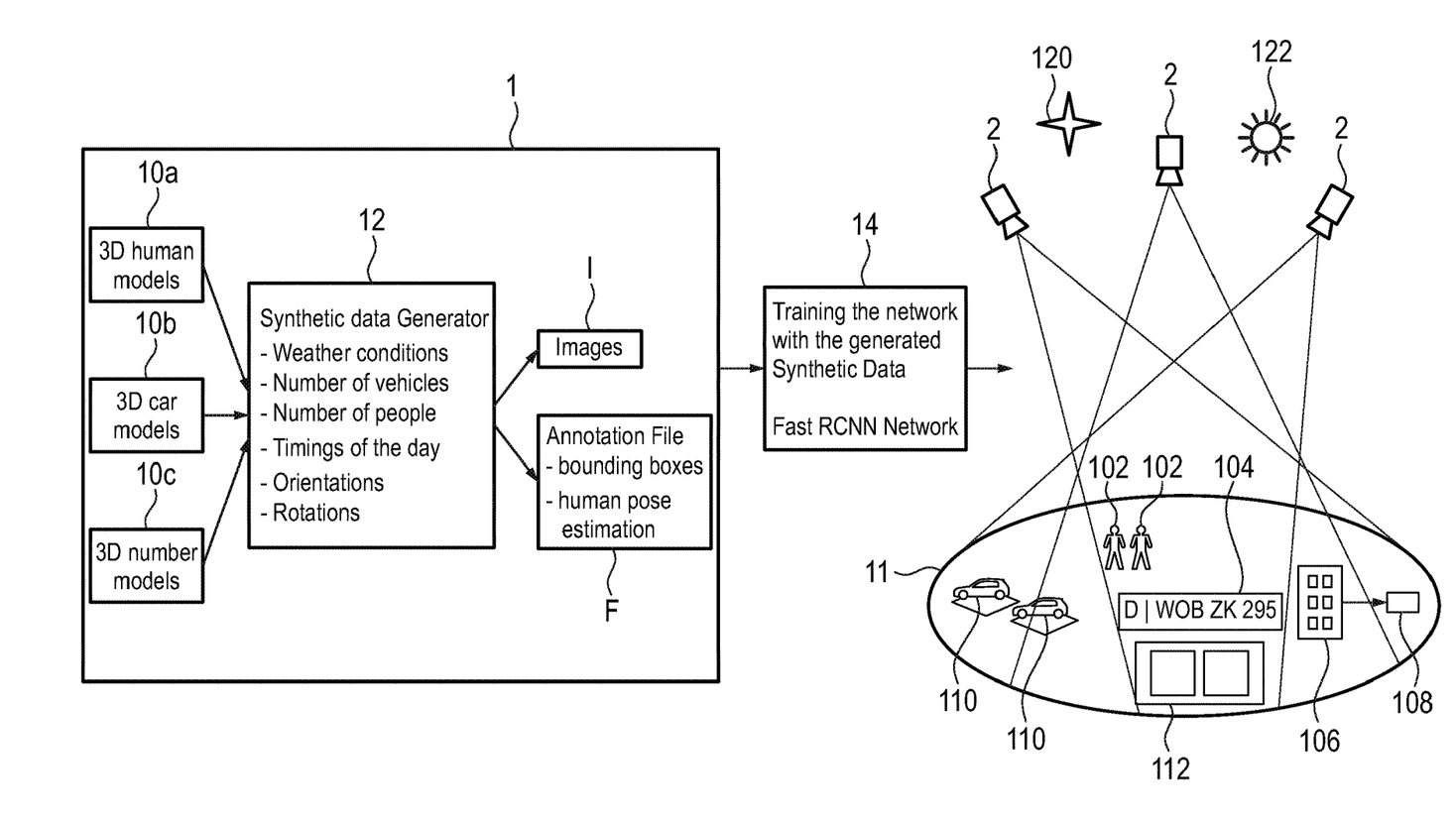
FIG. 1 illustrates a schematic view of a surveillance system according to some aspects of the present disclosure.

Turning to FIG. 1, the drawing shows a schematic view of a surveillance system 100, in particular an area security surveillance system, according to an embodiment of the present disclosure using synthetic (training) data and/or based on synthetic (training data).

The surveillance system 100 in this example includes three sensor devices 2, which may be cameras configured to capture images (e.g., 2D images). Two straight lines originating from each sensor device (e.g., camera) 2, illustrate the field of view (FOV) of the sensor device 2, respectively. The field of view is the part and/or the area of the environment and/or the world that is visible through the sensor device 2 and/or recordable by the sensor device 2 and/or detectable by the sensor device 2 with respect to the position and/or orientation of the sensor device 2. Objects outside the FOV, when the locally resolved sensor data are generated by the sensor device and/or when the picture and/or image is taken, are not recorded and/or are not depicted and/or not shown in the image and/or the locally resolved sensor data.

Reference sign 11 denotes the environment to be surveilled, which is in particular the part of the environment (of the real world) that is to be surveilled and/or that is surveilled by the surveillance system 100. The field of views of the three cameras 2 of the surveillance system 100 illustrated in FIG. 1 cover (and/or form and/or correspond to) the environment to be surveilled 11.

For instance, the environment to be surveilled may be (fenced) company premises, which can be entered (by humans 102 and/or vehicles 110) only through a gate 112, and which is to be surveilled by the surveillance system 100 during day, illustrated in FIG. 1 by the symbol of a sun 122, and night, illustrated in FIG. 1 by the symbol of a star 120.

Here, two cars 110, two humans 102, a number plate 104 (in particular as being part of a vehicle 110), buildings 106 are examples of objects which may, in particular at a certain point of time, be part of the area and/or the environment that is surveilled by the surveillance system 100.

The surveillance system 100 may additionally be configured to provide an indoor surveillance, in which an indoor environment to be surveilled, for instance the inner part of the building 106, as a room 108 of the building, may be surveilled.

In some examples an automated area security configuration may include surveillance system 100 being developed and/or based on synthetic training data. The system and/or the machine learning unit 14 may be configured to train 3D models of cars (10b), humans (10a), environments, numbers (10c) to recognize car number plates and other number detection cases.

The disclosed configuration may provide an all-round security surveillance built on synthetic data that is trained on a machine learning model to recognize unauthorized vehicles 110 in prohibited spots, unauthorized persons 102 entering restricted areas, detection of objects and people 102 during unexpected times. Such configurations may generate synthetic training data for security and surveillance and transmit this data to a neural network, in preferably a Fast-R-CNN network, to perform the tasks for the security and surveillance of an area.

The configuration may be structured using the following examples:

1) 3D models of humans (10a), vehicles (10b), numbers (10c) and environments are passed into the synthetic data generator tool and/or into the training data generation unit (12) to generate (training) images I and annotation files F, in particular containing bounding boxes, reading and/or human pose estimations, registering the FOV and other camera parameters similar to the installed cameras 2, etc.

The set of training data, (e.g., training images I), may be generated based on at least one 3D model (10a-c) of an object of interest by varying and/or amending at least one (in particular pre-set) parameter being characteristic for a weather condition, a number of vehicles, a number of people, a timing of the day, an orientation and/or a rotation.
2) These images and annotation files may be transmitted via the Fast-R-CNN neural network to the machine learning unit 14, for training the generated synthetic data (the generated set of training data) on the machine learning algorithm for the area security and surveillance system 100.
3) Cameras 2 are configured to be installed in the area for surveillance and/or the environment to be surveilled 11.
4) The video stream captured by the cameras 2 on site, is then passed to the neural network for detection of unauthorized objects and activities automatically.
5) If an unauthorized activity is detected, like a person 102 in an unexpected premises, a person in an unauthorized room 108, a vehicle 110 which is not supposed to be expected on a particular property by detection of a car 110 or reading a number plate 104 of the car or at certain hours where activity is not supposed to be detected in the area under surveillance 11.
6) If any of the above actions are detected, the algorithm may automatically alert the concerned person or authority as set in the system 100. This saves the delay caused by manual intervention and playing back the video. Most times, the person has already escaped in this old process of surveillance.

In some examples, synthetic training data may be generated in generation system 1 and training system and/or machine learning unit 14 for security and surveillance purposes to ensure complete surveillance of an area 11 and also a feedback to report if any suspicious activity is going on. All this will be done automatically once the 3D model 10a-c) has been uploaded.

This means, hours of efforts and costs may be saved from manually recording data, labelling the data, reducing human surveillance and personnel for monitoring and delays in finding out movements or activity which is suspicious in a particular area during the night or day.

Preferably, it is an integrated solution with a front end user interface (UI) with a computer vision platform for end to end data generation and training in a closed loop.

The system, under some examples, enables import of one of more 3D or 2D data that can be used to render images in a very short period of time, with minimal effort, and further also train the data for various use cases in the fields of object detection or segmentation for detection of cars, humans, signs, presence of an object or a person where not expected during night and day, only with synthetic data. This data is further passed on to the fast R-CNN neural network where this synthetic data is trained for object detection, segmentation and pose estimation and compared with the live video streams to detect any security threats. This process of data generation and training can be triggered by the user using the user interface.

Preferably, the system also provides an automated result evaluation to check if the desired accuracy has been reached. If not, the data is automatically regenerated and trained by the system till the user gets the required accuracy and output in the training process, thus supporting a closed cycle with minimal computer vision knowledge and intervention required.

Aspects of the system include:
Import one or more 2D &/or 3D models (using the UI)
Generate images and annotation data using the system UI
Send synthetic data for training in Fast R-CNN network
Automated result evaluation
Regenerate data if accuracy is not optimal thus offering an automated closed loop for data generation and training with little or no manual intervention or knowledge in computer vision required.
Pass the live video stream captured by the cameras 2 installed on site in the surveillance areas 11 and pass them through the synthetic area security and surveillance system 100 to detect any threats or unusual activities without or with minimal human intervention.
If an unexpected threat or activity is detected the system 100 gives a feedback signal to warn the user to check the area and also has the option to lock the gates 112 of the area through the system 100 automatically till the user has marked the area as safe again.

The synthetic data generator for security and surveillance of environments enables generating a large variety of datasets with a number of different options like number of instances, field of view, cropping, occlusion, adding distraction objects, adjusting the lighting conditions, the blur in the images, random set of over 2000 backgrounds images, different weather conditions, timings of the day and the possibility to add custom images as well. These randomized set of rendered parameters in the generated dataset is then used for generating images I and image annotation data F which will be further passed to the machine learning Fast-R-CNN network.

Training a Machine Learning Model to estimate the 3D-location from 2D-images requires annotated data F under some examples. This data is typically tedious to acquire and usually requires many hours of manual labor and knowledge on programming, computer vision and labelling of data. The proposed application offers the possibility of generating 2D images and associated annotations along with the possibility of training and using a machine learning network automatically. A closed loop cycle is also activated if the specified required accuracy
after the testing is not achieved, the application triggers generation of new images and passes it to the model as repeats the data generation, training and testing cycle again which is important in the field of security and surveillance.

The applicant reserves the right to claim all features disclosed herein as being an essential feature of the present disclosure, as long as they are new, individually or in combination, in view of the prior art. Furthermore, it is noted that in the FIGURES features are described, which can be advantageous individually. One skilled in the art will directly recognize that a specific feature being disclosed in a FIGURE can be advantageous also without the adoption of further features from this FIGURE. Furthermore, one skilled in the art will recognize that advantages can evolve from a combination of diverse features being disclosed in one or various FIGURES.

LIST OF REFERENCE SYMBOLS

1 System for generating a synthetic training data set
10*a-c* 3D models
11 Environment to be surveilled
12 Training Data Generation unit/Synthetic data Generator
14 Machine learning unit
100 Surveillance system
102 human
104 Number plate
106 building
108 room
110 vehicle
112 gate
120 night
122 day
I Training image
F Annotation File

The invention claimed is:
1. A computer-implemented method, comprising:
receiving spatially-resolved sensor data of an environment from at least one sensor device, the sensor data comprising at least one user-defined object of interest;
receiving at least one two-dimensional (2D) or three-dimensional (3D) model of a user defined object of interest based on user input data;
determining at least one render parameter based on the user input data;
generating a set of training images by rendering the at least one model of the object of interest, based on the determined at least one render parameter;
generating annotation data for the set of training images with respect to the at least one object of interest;
generating a training data set comprising the set of training images and the annotation data; and
processing the training data set for training a computer vision model for surveilling the environment.

2. The computer-implemented method according to claim 1, wherein generating the training data set comprises one or more of (i) determining at least one model of the object of interest, (ii) determining at least one render parameter, and/or (iii) determining at least parts of a rendered training image, based on at least one environment parameter being characteristic for the environment to be surveilled and/or for the at least one sensor device.

3. The computer-implemented method according to claim 2, wherein the at least one render parameter is determined based on one or more of (i) a field of view, (ii) a position, (iii) an orientation, and/or (iv) a sensor data generation parameter of the at least one sensor device.

4. The computer-implemented method according to claim 2, wherein determining the at least one render parameter comprises randomly determining the at least one render parameter based on the user input data.

5. The computer-implemented method according to claim 1, wherein generating the set of training images comprises generating the set of training images based on one of photorealistic images, background images and/or 3D environment data of a part of the environment to be surveilled.

6. The computer-implemented method according to claim 1, wherein generating the set of training images comprises generating the set of training images based on one or more of (i) a random variation of a lighting condition, (ii) a weather condition, and/or (iii) a time of day.

7. The computer-implemented method of claim 1, further comprising automatically executing a security function based on the training data set.

8. A computer-implemented method, comprising:
receiving spatially-resolved sensor data of an environment from at least one sensor device, the sensor data comprising at least one user-defined object of interest;
receiving, via a user interface, at least one two-dimensional (2D) or three-dimensional (3D) model of the at least one user-defined object of interest based on user input data received via the user interface;
accessing a trained machine-learning computer vision model for the environment, wherein the computer vision model comprises a set of parameters comprising values based on a synthetic training set rendered from the at least one 2D or 3D model of the at least one user-defined object of interest, wherein the set of parameters comprise (i) at least one render parameter received via the user interface based on the user input data received via the user interface, the at least one render parameter comprising one or more of a view angle, a zoom range, an occlusion, and a cropping parameter, and (ii) at least one environment parameter being characteristic for the environment to be surveilled and/or for the sensor device;
processing the spatially-resolved sensor data relative to the at least one user-defined object of interest to determine at least one surveillance parameter; and
executing a security function based on the at least one surveillance parameter.

9. The computer-implemented method according to claim 8, wherein processing the spatially-resolved sensor data comprises processing the spatially-resolved sensor data in real time.

10. The computer-implemented method according to claim 8, further comprising
detecting the object of interest is detected via the machine-learning computer vision model; and
evaluating the object of interest with respect to (i) a threat to the environment to be surveilled and/or (ii) an authorization, depending on one or more of (a) a location of detecting of the object of interest, (b) a time of detection of the object of interest, and/or (c) an identification of the object of interest.

11. The computer-implemented method according to claim 8, further comprising determining a warning signal in dependence on the surveillance parameter, and generating a warning signal output via an output device.

12. The computer-implemented method according to claim 11, wherein generating the warning signal comprises generating and transmitting the warning signal using contact data relating to a contact person.

13. The computer-implemented method according to claim 8, wherein the security function comprises activating a security state of the environment, in which in entrances and exits to and from at least parts of the environment are locked.

14. A surveillance system, comprising:
at least one sensor device for producing spatially-resolved sensor data of an environment,
a user interface for receiving user input data and selecting at least one user-defined object of interest in the sensor data;
a training data generation unit receiving at least one two-dimensional (2D) or three-dimensional (3D) model of a user defined object of interest based on user input data, wherein the training data generation unit is configured to
determine at least one render parameter based on the user input data;
generate a set of training images by rendering the at least one model of the object of interest, based on the determined at least one render parameter;
generate annotation data for the set of training images with respect to the at least one object of interest;
generate a training data set comprising the set of training images and the annotation data; and
a processing device for processing the training data set for training a computer vision model for surveilling the environment.

15. The system according to claim 14, wherein the training data generation unit is configured to generate the training data set by one or more of (i) determining at least one model of the object of interest, (ii) determining at least one render parameter, and/or (iii) determining at least parts of a rendered training image, based on at least one environment parameter being characteristic for the environment to be surveilled and/or for the at least one sensor device.

16. The system according to claim 15, wherein the at least one render parameter is determined based on one or more of (i) a field of view, (ii) a position, (iii) an orientation, and/or (iv) a sensor data generation parameter of the at least one sensor device.

17. The system according to claim 15, wherein the at least one render parameter comprises at least one randomly determined render parameter based on the user input data.

18. The system according to claim 14, wherein the training data generation unit is configured to generate the set of training images by generating the set of training images based on one of photorealistic images, background images and/or 3D environment data of a part of the environment to be surveilled.

19. The system according to claim 14, wherein the training data generation unit is configured to generate the set of training images by generating the set of training images based on one or more of (i) a random variation of a lighting condition, (ii) a weather condition, and/or (iii) a time of day.

20. The system of claim 14, wherein the processing device is configured to automatically execute a security function based on the training data set.

\* \* \* \* \*